(12) United States Patent
Jayaratne et al.

(10) Patent No.: US 12,538,037 B1
(45) Date of Patent: Jan. 27, 2026

(54) SENSOR CLEANING ASSEMBLY WITH ROTATING SENSOR WINDOW

(71) Applicant: Zoox, Inc., Foster City, CA (US)

(72) Inventors: Rajith Jayaratne, Castro Valley, CA (US); Daniel Glenn Johnson, San Francisco, CA (US); Arvind Pattabhiraman, Alameda, CA (US); Raghuraman Surineedi, Menlo Park, CA (US); Bingchao Han, Goleta, CA (US)

(73) Assignee: Zoox, Inc., Foster City, CA (US)

( * ) Notice: Subject to any disclaimer, the term of this patent is extended or adjusted under 35 U.S.C. 154(b) by 122 days.

(21) Appl. No.: 18/233,246

(22) Filed: Aug. 11, 2023

(51) Int. Cl.
*B08B 17/02* (2006.01)
*H04N 23/51* (2023.01)
*H04N 23/81* (2023.01)

(52) U.S. Cl.
CPC .......... *H04N 23/811* (2023.01); *H04N 23/51* (2023.01)

(58) Field of Classification Search
CPC .............................. H04N 23/811; H04N 23/51
See application file for complete search history.

(56) References Cited

U.S. PATENT DOCUMENTS

| | | | | |
|---|---|---|---|---|
| 2013/0019618 | A1* | 1/2013 | Veerasamy | B60S 1/087 62/85 |
| 2015/0015713 | A1* | 1/2015 | Wang | H04N 23/55 348/148 |
| 2020/0275004 | A1* | 8/2020 | Condron | H04N 23/61 |
| 2022/0227333 | A1* | 7/2022 | Matsunaga | G03B 17/02 |
| 2024/0147036 | A1* | 5/2024 | Sun | B60R 11/04 |
| 2024/0246513 | A1* | 7/2024 | LaCross | H04N 23/57 |

\* cited by examiner

*Primary Examiner* — Patrick E Demosky
(74) *Attorney, Agent, or Firm* — Lee & Hayes, P.C.

(57) ABSTRACT

A sensor assembly includes one or more sensors configured to collect data from an environment. A sensor window is disposed in a field of view of the sensor, such that the sensor senses the environment through the sensor window to generate sensor data. The sensor window is rotated relative to the sensor to cause obstructions on the sensor window, like water or debris, to disperse.

20 Claims, 9 Drawing Sheets

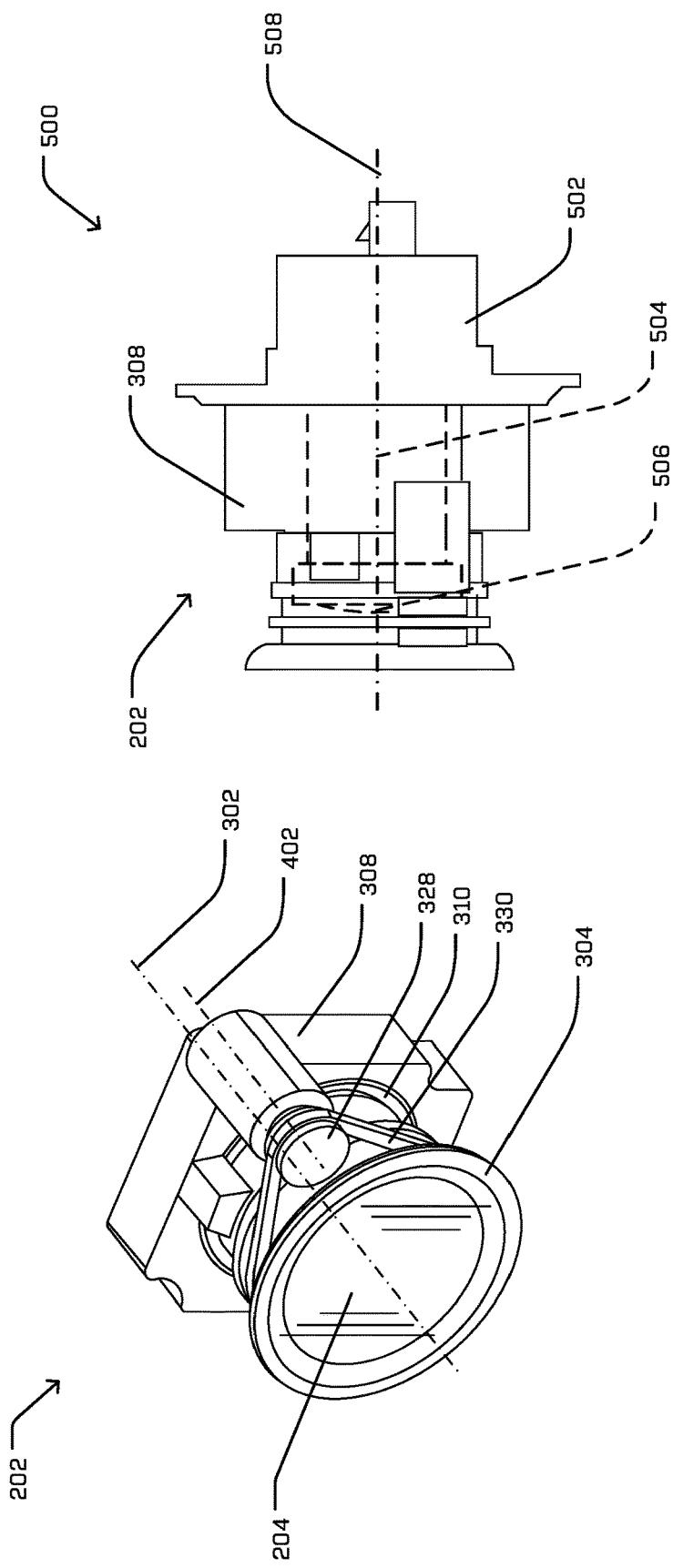

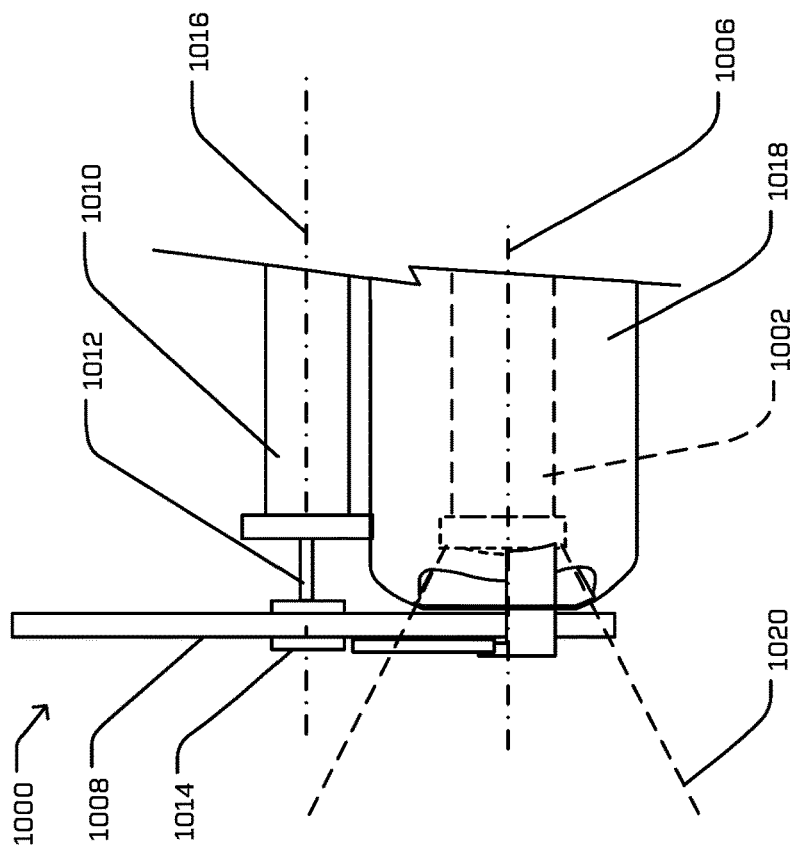
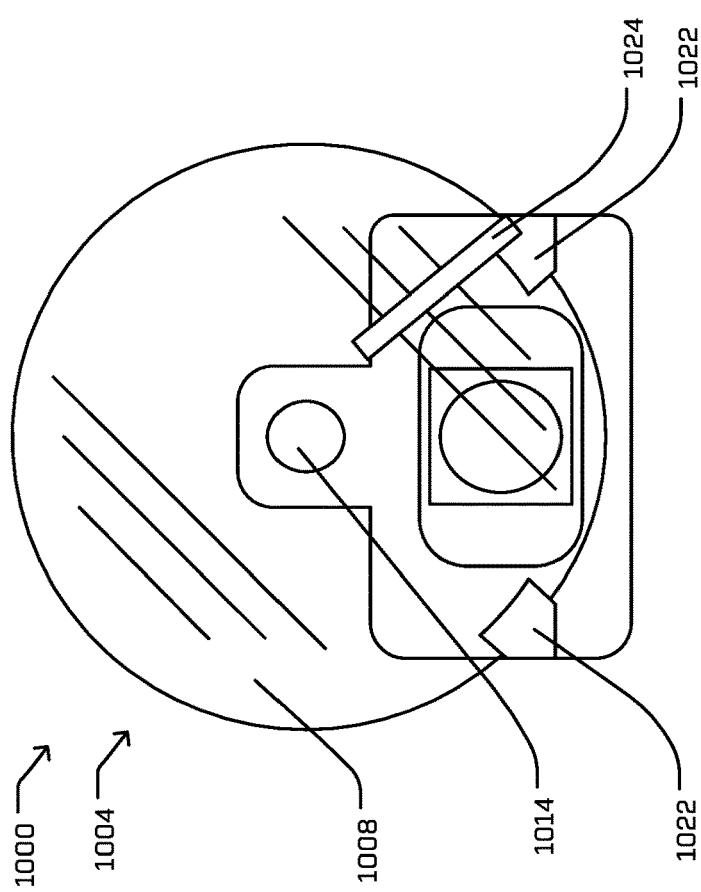
FIG. 10B
FIG. 10A

SENSOR CLEANING ASSEMBLY WITH ROTATING SENSOR WINDOW

BACKGROUND

Many vehicles in operation today are designed to perceive their surroundings using sensors. However, the effectiveness of the sensor may be compromised if the operating view of the sensor is partially or completely blocked by an obstruction, such as, for example, water, water droplets, moisture (e.g., rain, snow, ice, condensation, etc.), debris, or the like. Such obstructions may block a portion of the field of view of the sensor and/or result in the generation of sensor data that provides an inaccurate representation of one or more objects present in the sensed environment. This situation may be particularly problematic when, for example, the sensor is used to provide sensor data for autonomous operation of a machine without the presence or assistance of an operator that might be able to detect and/or remove the obstruction from the sensor. For example, an autonomous vehicle operating without an operator may rely heavily on data generated by sensors for proper operation. If one or more of the sensors has an obstruction that affects the accuracy of the data generated by the sensor, the autonomous vehicle may take actions based on inaccurate information related to the environment through which it is travelling, such that, for example, the autonomous vehicle may be unable to detect or identify objects, or locate the positions and/or trajectories of objects in the environment. This may hinder operation of vehicles implementing these sensors.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 4 is a perspective view of the sensor cleaning assembly of FIG. 3, in an assembled state, in accordance with aspects of this disclosure.

FIG. 5 is a top view of a sensor system including the sensor cleaning assembly of FIGS. 3 and 4 and a sensor, in accordance with examples of the disclosure.

FIGS. 10A and 10B are side and top view, respectively, of another sensor cleaning assembly with a sensor window, in accordance with examples of this disclosure.

DETAILED DESCRIPTION

Figure 1:
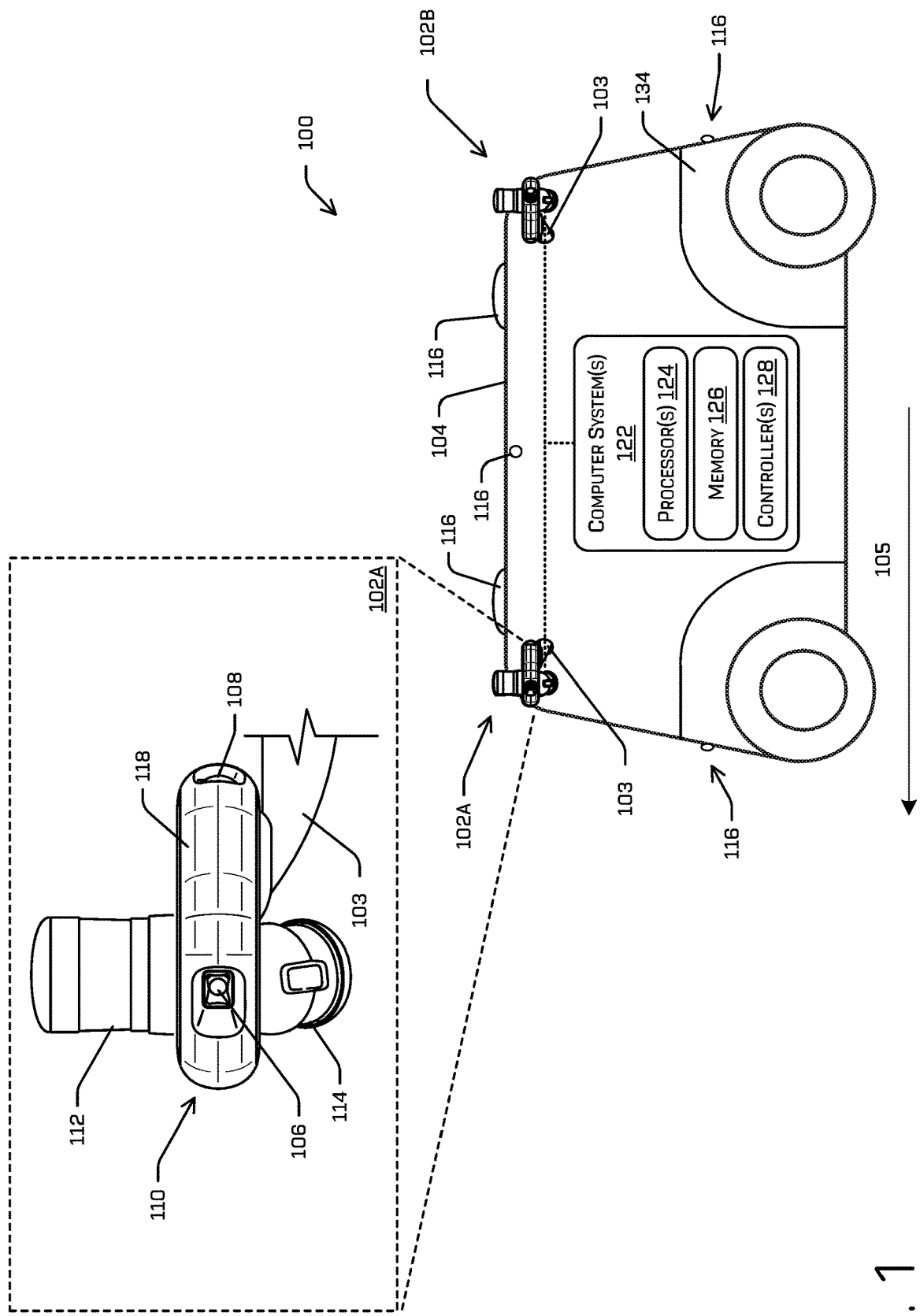
FIG. 1 is an illustration of an example vehicle having one or more sensor pods to collect and provide data to the autonomous vehicle, in accordance with examples of the disclosure.

As discussed above, vehicles and other autonomous and semi-autonomous systems are increasingly using sensors to perceive an environment in which these systems are to operate. However, sensor data is susceptible to degradation when obstructions are present. For example, some systems include externally-mounted sensors that can be impacted by conditions in the environment, including but not limited to moisture, precipitation, dust, debris and/or other substances that may accumulate on a lens or other surface through which the sensor perceives the environment. Presence of these obstructions may distort, degrade, or otherwise effect the sensor data generated by the sensor, which can result in incorrect perception of the environment.

This application relates to structures and techniques for reducing sensor degradation in the presence of obstructions such as precipitation, moisture, debris, dirt, or other impediments to clearly sensing the environment via a sensor. In examples, this application relates to a sensor cleaning system that may be incorporated into a sensor assembly to remove obstructions that may otherwise accumulate in a field of view of the sensor. In examples, the sensor cleaning system may be included in self-contained assemblies or "sensor pods" that are removably coupled to a vehicle. Multiple sensor pods, for example four, may be disposed around an exterior of the vehicle to provide sensor coverage for an environment surrounding the vehicle.

In examples of this disclosure, a sensor cleaning assembly includes a sensor window disposed in a field of view of a sensor. Specifically, aspects of this disclosure relate to removing obstructions that can impact sensor data by positioning the sensor window such that would-be obstructions contact the sensor window (instead of the sensor). The sensor window may be a transparent disc placed in front of a lens of a sensor configured to image an environment. As detailed herein, the sensor window is configured to rotate or spin, e.g., such that obstructions on the sensor window disperse from the sensor window under a centrifugal force.

Aspects of this disclosure also include a sensor window housing for holding the sensor window. In examples, the sensor window housing may be configured to circumscribe or otherwise envelope a portion of a sensor. Accordingly, obstructions that may otherwise impact the sensor and that do not contact the sensor window may contact the sensor window housing. The sensor window may be fixed to the sensor window housing, such that rotation of the sensor window housing results in corresponding rotation of the sensor window.

In examples of this disclosure, a sensor window housing may be driven to rotate by an actuator. For example, the sensor window housing may include one or more drive feature that facilitate driving by the actuator. In one example, an outer surface of the sensor window housing may include a groove for receiving a portion of a belt. The belt may be driven by the actuator, e.g., via a pulley coupled to a shaft of the actuator. In other examples, gears, friction components, and/or other driving components may be used. In still further examples, the sensor window housing may be driven directly by the actuator.

In examples of this disclosure, the sensor window may be disposed to rotate about an axis that extends into a field of view of the sensor. In some examples, the axis of rotation of the sensor may be coaxial with an optical axis of the sensor. In other examples, the axis of rotation may be substantially parallel to the optical axis of the sensor, e.g., parallel and offset relative to the optical axis. In other examples, e.g., the axis of rotation may be arranged at an acute angle relative to the optical axis.

In some aspects of this disclosure, the sensor window can include a first trace and a second trace formed thereon. For example, the traces may form part of an electrical circuit that allows for heat generation, e.g., to heat the sensor window for defrosting or the like. In other examples, the circuit including the traces may be used to detect obstructions on the sensor window. Specifically, the traces may be arranged such that an obstruction will "short" or otherwise alter an attribute of the circuit. These alterations may be associated with a presence of an object, and the actuator may be caused to rotate or spin the sensor window in response to this detection.

In examples of this disclosure, obstructions that may otherwise interfere with generation of sensor data may be removed from a field of view of the sensor. Accordingly, the senor data is not degraded by the presence of the obstruction. Some conventional obstruction-mitigation techniques have relied heavily on computing-based techniques, e.g., to identify and/or mitigate the effects of the obstruction. Aspects of this disclosure may provide a hardware solution that results in improved sensor data.

Some examples are provided in the context of a vehicle having sensor pods disposed on the vehicle and including sensors to generate sensor data about an environment. In other examples, the sensor cleaning apparatus and methods described herein can be incorporated with individual, e.g., single, stand-alone sensors and/or other numbers and configurations of sensors. Moreover, although examples of this disclosure relate to sensors incorporated into sensor systems disposed on autonomous vehicles, aspects of this disclosure may be incorporated into sensor systems used in other vehicle types, including but not limited to semi-autonomous or manual vehicles including sensors for driver assistance and/or other functionalities. The sensor cleaning systems and methods described herein may also or alternatively be used with any other sensors used to surveille an environment for any purpose, e.g., whether or not associated with operation of a vehicle.

Additional details of this disclosure now will be described with reference to the Figures, in which the same reference numerals are used to reference the same components.

FIG. 1 is an illustration of an example vehicle 100 having one or more sensor pod assemblies configured with multiple sensors to collect information about the surroundings of the autonomous vehicle, in accordance with examples of the disclosure. The vehicle 100 shown in FIG. 1 is a bi-directional autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle may be a fully or partially autonomous vehicle having any other level or classification. Moreover, in some instances, aspects of sensor assemblies described herein may be applicable to non-autonomous and/or non-bidirectional vehicles as well. Also, while examples are given in which the vehicle is a land vehicle, the techniques described herein are also applicable to aerial, marine, and/or other vehicles.

In the illustrated example, the vehicle 100 includes a first sensor pod assembly 102A and a second sensor pod assembly 102B (collectively "the sensor pod assemblies 102") coupled, via a sensor pod mount 103 to a body 104 of the vehicle 100. In FIG. 1, the first sensor pod assembly 102A is on a leading end of the vehicle 100 and the second sensor pod assembly 102B is on a trailing end of the vehicle 100 when the vehicle 100 is travelling forward in a direction shown by an arrow 105. As noted above, the vehicle 100 may be a bi-directional vehicle, e.g., configured to travel forward in the direction shown by the arrow 105 or alternately forward in an opposite direction. Thus, the sensor pod assemblies 102 may be alternately on the leading end of the vehicle, e.g., sensing objects generally in front of the vehicle 100, or on the trailing end of the vehicle 100, e.g., sensing objects generally behind the vehicle 100. In examples, each of the sensor pod assemblies 102 may be substantially identical, e.g., including the same or similar sensors configured to sense a field of view relative to the respective sensor pod assemblies 102.

FIG. 1 also includes a close-up of the first sensor pod assembly 102A. The sensor pod assembly 102A includes a plurality of sensors, including sensors of multiple modalities. Specifically, the sensor pod assembly 102A includes a side-facing camera 106 and a rear-facing camera 108. Although not visible in FIG. 1, the sensor pod assembly 102A also includes a front-facing camera (the location of which is shown generally by the reference numeral 110). The sensor pod assembly 102A also includes a first LiDAR sensor 112 and a second LiDAR sensor 114. As shown, the first LiDAR sensor 112 is generally on top of the first sensor pod assembly 102A and the second LiDAR sensor 114 is generally on a bottom of the first sensor pod assembly 102A. Although the first sensor pod assembly 102A is illustrated as including three cameras and two LiDAR sensors, the first sensor pod assembly 102A may include more, fewer, and/or different types of sensors. Moreover, and as shown in FIG. 1, the vehicle 100 may have one or more additional sensors 116 disposed at other positions on the vehicle 100.

FIG. 1 also shows that the first sensor pod assembly 102A includes an outer shell 118 or trim. The outer shell 118 may be disposed to protect aspects of the cameras 106, 108, 110 and/or the LiDAR sensors 112, 114, e.g., from the environment. Without limitation, the outer shell 118 can form an enclosure for the various sensors and electronic components disposed within the sensor pod assemblies 102.

In operation, the sensors associated with the sensor pod assemblies 102 are configured to generate sensor data associated with an environment of the vehicle. For instance, the sensor pod assemblies 102 may, together, have an effective field of view that provides sensor data for substantially all of the area surrounding the vehicle 100, e.g., 360-degrees about the vehicle 100. Moreover, sensors associated with the sensor pod assemblies 102 may be configured to provide overlapping fields of view, e.g., such that at least two sensors are configured to generate data for regions about the vehicle 100.

Data from the sensors associated with the sensor pod assemblies 102 is transmitted, e.g., via a wired or wireless connection, to one or more computer systems 122 associated with the vehicle 100. In some examples, the computer system(s) 122 control operation of one or more systems of the vehicle 100. In the illustrated example, the computer system(s) 122 include one or more processors 124, memory 126 communicatively coupled to the processor(s) 124, and one or more controllers 128. In examples, the memory may store instructions to receive and process sensor data from one or more sensors and to plan a route for the vehicle 100 through an environment. For instance, the planned route may be implemented via the controller(s) 128 operating the vehicle 100 autonomously.

The processor(s) 124 of the vehicle 100 may be any suitable processor capable of executing instructions to process data and perform operations as described herein. By way of example and not limitation, the processor(s) 124 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

The memory 126 is an example of non-transitory computer-readable media. The memory 126 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 126 may include at least a working memory and a storage memory. For example, the working memory may be a high-speed memory of limited capacity (e.g., cache memory) that is used for storing data to be operated on by the processor(s) 124. In some instances, memory 130 may include a storage memory that may be a lower-speed memory of relatively large capacity that is used for long-term storage of data. In some cases, the processor(s) 124 cannot operate directly on data that is stored in the storage memory, and data may need to be loaded into a working memory for performing operations based on the data, as discussed herein.

As illustrated in FIG. 1, and as noted above, the sensor pod assemblies 102 are disposed on the vehicle 100 at positions to provide adequate fields of view for detecting objects relative to the vehicle 100. In some instances, including the illustrated example, the sensor pod assemblies 102 protrude from a side or top of the body 104 of the vehicle 100, e.g., to effectively increase the footprint of the vehicle 100. Accordingly, the positions of the sensor pod assemblies 102 may avail the sensor pod assemblies 102 to being impacted by obstructions. For example, when the vehicle 100 is driving in precipitation or foggy conditions, moisture may accumulate on the sensors, e.g., as water droplets, ice, or the like. For example, water droplets can accumulate on a lens of one or more of the cameras 106, 108, 110. The sensors may also be susceptible to being impacted by other obstructions, including but not limited to dust, debris, mud, bugs, and/or the like. These and/or other obstructions can adversely affect sensor data generated by the sensors in the sensor pod assemblies 102. For example, when a water droplet forms on a lens of the camera 106, the water droplet can occlude a portion of a field of view of the camera 106. This occlusion may result in degraded image data, which may result in false negatives and/or false positives when using the image data to identify objects.

Figure 2:
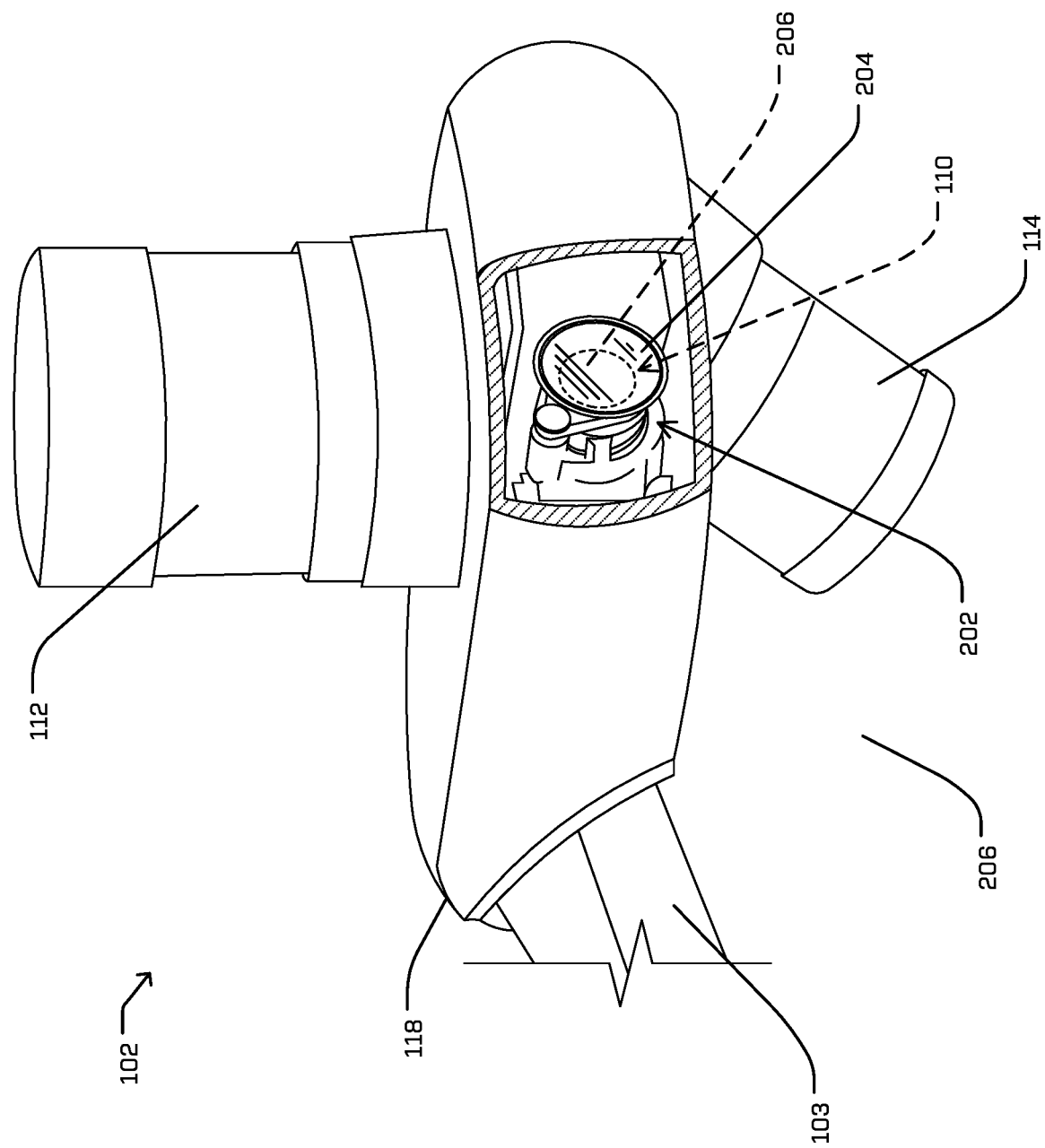
FIG. 2 is a top perspective view of an example sensor pod including a sensor cleaning assembly, in accordance with examples of the disclosure.
Figure 3:
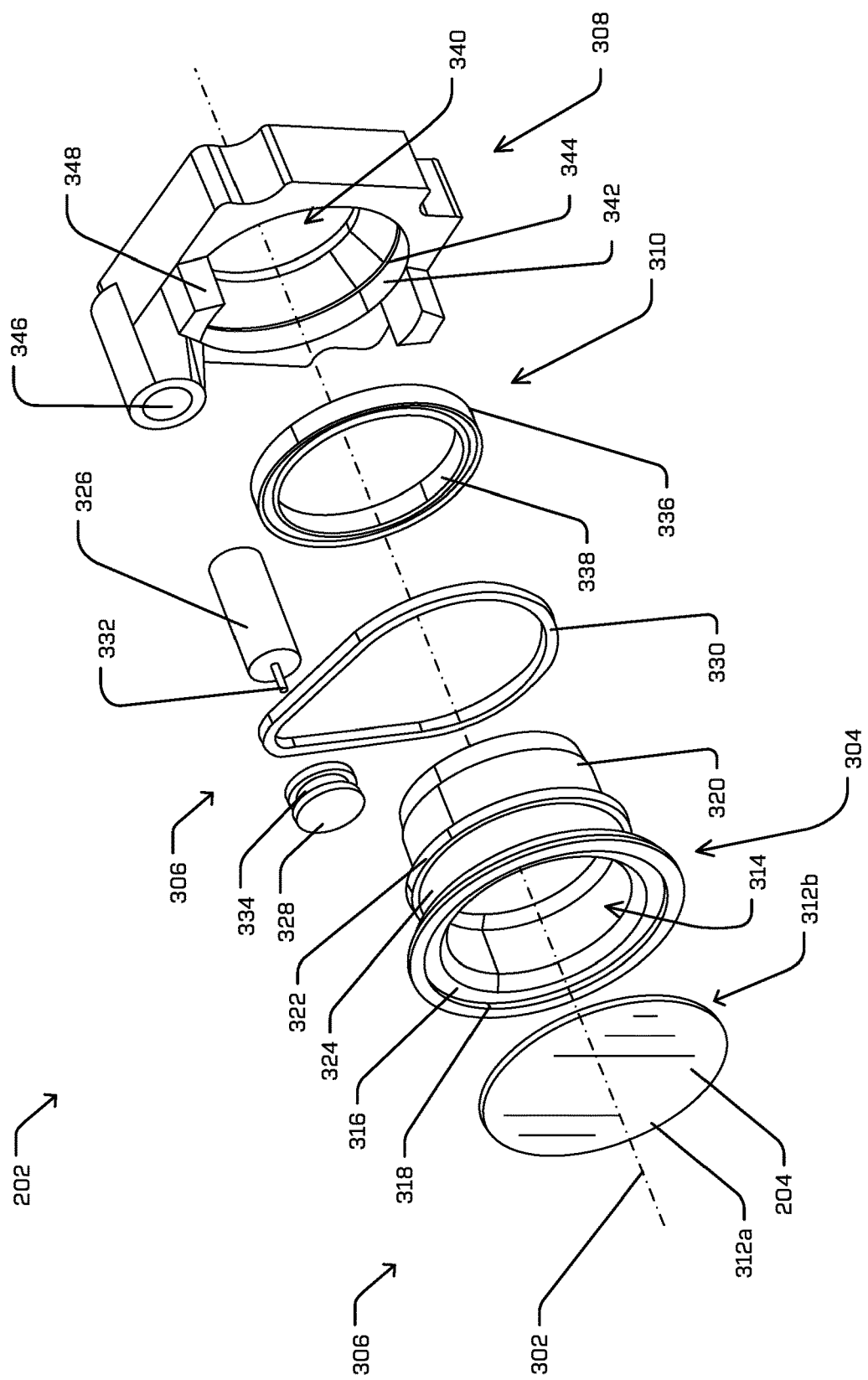
FIG. 3 is an exploded perspective view of the sensor cleaning assembly of FIG. 2, in accordance with examples of the disclosure.

Aspects of this disclosure are particularly directed to mitigating the effects of obstructions to aspects of the sensor pod assemblies 102 by implementing sensor cleaning systems and techniques. These sensor cleaning systems of the present disclosure are detailed further below with reference to additional figures. Specifically, FIG. 2 is a perspective view of one of the sensor pod assemblies, with a portion of the outer shell 118 removed to illustrate a sensor cleaning system. FIGS. 3 and 4 are an exploded perspective view and a perspective view, respectively, of aspects of the sensor cleaning system of FIG. 2. FIG. 5 is a side view of a sensor system including the sensor cleaning system of FIG. 2. FIG. 6 is a plan view of an example of a sensor window for use in a sensor cleaning system, and FIG. 7 is a perspective view of another example of a sensor cleaning system.

FIG. 2 shows a perspective view of one of the sensor pod assemblies 102. For example, FIG. 2 is a top perspective view showing additional details associated with the outer shell 118 and some internal components. In the illustration, a portion of the outer shell 118 proximate the front-facing camera 110 is removed to show aspects of a sensor cleaning system 202. As detailed further herein, the sensor cleaning assembly 202 includes a sensor window 204, e.g., a transparent member, positioned relative to a sensor such that the sensor senses the environment through the sensor window 204. In the illustrated example of FIG. 2, the sensor cleaning assembly 202 includes the sensor window 204 in front of a lens 206 of the camera 110. Accordingly, image data generated by the camera 110 is based on light received through the sensor window 204. Stated differently, according to aspects of this disclosure, a sensor is positioned "behind" a transparent window, e.g., the sensor window 204, relative to the environment to be sensed. The sensor window 204 may comprise any material and/or medium through which an associated sensor may receive a signal indicative of the environment, and thus, may include, but is not limited to, transparent materials, translucent materials, glass, polymers, polycarbonates, and/or combinations thereof.

In examples of this disclosure, a surface of the sensor window 204 opposite the sensor, e.g., opposite the camera 110, is exposed to the environment. Accordingly, any potential obstructions to generation of quality sensor data, e.g., rain, snow, debris, dust, bugs, or the like will impact the sensor window 204, e.g., instead of a lens of the sensor. Thus, aspects of this disclosure include functionality to clean the sensor window 204. Specifically, in aspects of this disclosure, the sensor window 204 is configured to rotate. In the illustrated example, the sensor window 204 is configured to rotate in a plane that is substantially (e.g., within a tolerance of) normal to the optical axis of the camera 110. Rotation of the sensor window 204 imparts a centrifugal force on any impediments or obstructions that may contact the sensor window 204. That is, as the sensor window 204 rotates, any objects e.g., water droplets, debris particles, or the like, that contact the sensor window 204 are, by action of the rotating window 204 dispersed in a direction away from the axis of rotation of the sensor window 204. By removing debris via this dispersion caused by rotation, the sensor window 204 may remain clean, allowing for a clear view of the environment for the sensor.

FIG. 3 shows an example of aspects of the sensor cleaning system 202. Specifically, FIG. 3 is an exploded view of the sensor cleaning system 202, generally exploded along an axis 302. As will be described further herein, the axis 302 may also be an axis of rotation of the sensor window 204 and/or the axis 302 may be coincident with an optical axis of the sensor with which the sensor cleaning system 202 is to be used.

In more detail, FIG. 2 shows the sensor window 204, a sensor window housing 304, driving components 306, a sensor mount 308, and a bearing 310. Additional details of these features are detailed below with reference to FIG. 2.

As discussed above, the sensor window 204 is a transparent member through which an environment is sensed/imaged. The sensor window 204 may be made of glass or other transparent material(s). In the illustrated example, the sensor window 204 is substantially circular, having a first face 312a exposed to the environment and an opposite, second face 312b facing a sensor (not shown in FIG. 3). The faces 312a, 312b are separated by a window thickness. The faces 312a, 312b of the sensor window 204 are illustrated as being substantially planar, although in other examples one or more of the faces 312a, 312b may be contoured or otherwise modified. For example, one or both of the faces may be at least partially concave, at least partially convex, and/or otherwise shaped. Because the sensor window 204 is intended to be positioned between a sensor and the environment, e.g., such that the environment is sensed through the sensor window 204, in some instances it may be desirable to construct the sensor window 204 to reduce an impact to the sensor. Making both faces 312a, 312b and minimizing a thickness between the faces 312a, 312b may achieve such an objective. In other examples, the sensor window 204 may be actively involved in the imaging. For example, the faces 312a, 312b of the sensor window 204 can be configured to assist in influencing light entering the sensor, e.g., by refracting, steering, and/or otherwise. That is, in addition to providing cleaning benefits described herein, the sensor window 204 may also be configured as an active lens element.

The sensor window housing 304 is configured to retain the sensor window 204. In the illustration, the sensor window housing 304 is substantially cylindrical, defining an opening 314. The opening 314 may be sized to circumscribe a portion of a sensor, such as a camera lens or the like. As shown in FIG. 3, proximate a first end of the opening 314, the sensor window housing 304 includes a ledge 316 bounded circumferentially by a window positioning sidewall 318. When assembled, the second face 312b of the sensor window 204 contacts the ledge 316, and the window positioning sidewall 318 constrains lateral movement of the sensor window 204. In examples, the circumference of the window positioning sidewall 318 may provide a slight clearance fit with an outer edge of the sensor window 204.

When assembled, the sensor window 204 may be fixed to the sensor window housing 304. For example, an epoxy, adhesive, or other chemical agent may be used to secure the sensor window 204 to the ledge 316. In other examples, the circumference of the window positioning sidewall may form an interference fit with sensor window 204, e.g., such that the sensor window 204 is press fit into the sensor window housing. In still further examples, the sensor window housing 304 may include one or more tabs, detents, or other retention mechanisms that may mechanically secure the sensor window 204 to the sensor window housing 304. Regardless of the manner in which the sensor window 204 is secured to the sensor window housing 304, in examples of this disclosure, the coupling of the sensor window 204 to the sensor window housing facilitates corresponding rotation of the sensor window 204 when the sensor window housing 304 is rotated, e.g., about the axis 302.

The sensor window housing 304 may also include features to facilitate rotation of the sensor window housing 304 (and thus the sensor window 204). As shown in FIG. 3, an outer surface 320 of a body of the sensor window housing 304 may be contoured. In the example, a ring or flange 322 is provided around the outer surface to define an axial extent of a groove 324. Although obscured in FIG. 3, an opposite axial extent of the groove 324 may be defined by a flange that protrudes to also define, at least in part, an extent of the window positioning sidewall.

The groove 324 may be engaged by the driving components 306 to facilitate rotation of the sensor window housing 304. More specifically, in the illustrated example, the driving components 306 include an actuator 326, a pulley 328 driven by the actuator 326, and a belt 330 that couples the pulley 328 to the groove 324 on the sensor window housing 304. In more detail, the pulley 328 is coupled to a shaft 332 of the actuator 326. The pulley 328 defines a groove 334 configured to receive the belt 330. Accordingly, rotation of the shaft 332 of the actuator 326 causes a corresponding rotation of the pulley 328, which drives rotation of the sensor window housing 304, via the belt.

In examples, the actuator 326 may be any rotary or other type of actuator that imparts rotational movement to drive the pully 328. In some examples, the actuator 326 may be a coreless DC motor, which may be chosen for its small size and relatively fast acceleration. Although not shown in FIG. 3, the actuator 326 may have electrical connections, e.g., which may be selectively controlled to provide power to the actuator 326.

Although the example of FIG. 3 illustrates the drive components 306 as including the pulley 328 and the belt 330, other drive components also are contemplated. For example, instead of a pulley and belt, the drive components 306 may include a geared arrangement. For example, a driving gear may be coupled to the shaft 332 of the actuator 326, and the outer surface 320 of the sensor window housing 304 may include corresponding gear teeth, e.g., to mesh with and be driven by the driving gear. Additional, e.g., intermediate, gears also may be provided. In examples, the drive components 306 can be any components that facilitate rotation of the sensor window housing 304 (or the sensor window 204 when no sensor window housing is included, e.g., as in examples discussed below). The drive components 306 can also include a friction drive, a direct drive, or the like.

The bearing 310 facilitates rotation of the sensor window housing 304, e.g., relative to the sensor mount 308. In the example illustrated in FIG. 3, the bearing 310 includes an outer ring 336 and an inner, concentric ring 338. The rings 336, 338 are configured to rotate relative to each other, e.g., about the axis 302. The bearing 310 may be a ring bearing, a ball bearing, or the like. When assembled, the inner ring 338 may be secured to the sensor window housing 304. For example, the inner ring 338 may be sized to be pressed onto the outer surface 320 of the sensor window housing 304, e.g., to form an interference fit with the outer surface 320. In examples, when the bearing 310 is secured to the sensor window housing 304, the bearing 310 may abut the flange 322, although such is not required.

The outer ring 336 of the bearing 310 is secured to the sensor mount 308. In the illustrated example of FIG. 3, the sensor mount 308 defines an inner opening 340. For example, the opening 340 may be sized to circumscribe a portion of a sensor with which the system 202 is to be used. The opening 340 may be contoured, and may include a bearing retention surface 342. In the example, the bearing retention surface 342 may a substantially cylindrical sidewall sized to receive the outer ring 336. For example, the bearing retention surface 342 may have a diameter that is sized to provide an interference or press fit with the outer surface of the outer ring 336. Also illustrated in FIG. 3, the opening 340 can define a bearing retention ledge 344, e.g., normal to an axial extent of the bearing retention surface 342. When the bearing 310 is received in the bearing retention surface 342, the bearing retention ledge 344 may position the bearing axially, e.g., by acting as a stop against which the bearing 310 abuts upon insertion into the opening 340.

The sensor mount 308 also includes an actuator mount 346. Specifically, the actuator mount 346 is illustrated as a bore configured to receive a body of the actuator 326.

The sensor mount 308 can include additional or other features, as well. For instance, the sensor mount 308 may also include one or more features for securing the sensor mount 308 relative to a sensor. In examples, the sensor mount 308 may include one or more holes, threads, and/or other features to secure the sensor mount 308 in a position such that the assembly 202 is fixed relative to a sensor (not shown in FIG. 3). As also shown in FIG. 3, the sensor mount can also include one or more protrusions 348 extending generally along the axis 302 from a face of the sensor mount 308. The protrusions 348 are illustrated as extending proximate an outer edge of the opening 340. In some instances, the protrusions 348 may act as positioning or alignment features. For instance, when the sensor cleaning assembly 202 is assembled, the flange 322 on the outer surface 320 of the sensor window housing 304 may contact or otherwise abut the protrusion(s) 348 to define an axial spacing of the sensor window housing 304 (and therefore of the sensor window 204) relative to the sensor mount 308. In one non-limiting example, a rear surface of the sensor mount 308 (e.g., the surface normal to the axis 302 that is obscured in FIG. 3) may provide a first datum surface to which a surface of a sensor, like the camera 110, is mounted. Surfaces of the protrusions 348 may provide a spacing from the datum surface to properly position the sensor window 204 relative to the sensor.

FIG. 4 is an assembled perspective view of the sensor cleaning assembly 202. As illustrated, the sensor cleaning assembly 202 provides a compact arrangement that facilitates rotation of the sensor window 204. Specifically, when the actuator (obscured in FIG. 4) rotates, the pulley 328 also rotates, e.g., about an axis of rotation 402 of the actuator. The rotation of the pulley 328 is transmitted, via the belt 330, to the sensor window housing 304, causing the sensor window housing 304 to rotate about the axis 302. The bearing 310 facilitates this rotation of the sensor window housing 304, e.g., relative to the sensor mount 308 (and relative to a sensor to which the sensor mount 308 is relatively fixed).

During rotation of the sensor window 204, water droplets, dirt, debris, and/or the like contacting the sensor window 204, e.g., the first or exposed face 312a of the sensor window 204, will experience a centrifugal force, e.g., radially away from the axis of rotation 302 of the sensor window 204. Under this centrifugal force the would-be obstructions to the sensor will disperse from the sensor window 204. In examples, the sensor window 204 may be rotated at speeds of from about 4000 RPM to about 6000 RPM. Moreover, the actuator 326 may be configured to drive the sensor window 204 in either a clockwise or a counterclockwise direction.

As illustrated, portions of the sensor 502 are contained entirely within the sensor window housing 302. The sensor window housing 302 may thus seal aspects of the sensor 502 from the environment. Moreover, and as detailed above, the sensor cleaning system 202 may be incorporated into or disposed in a senor pod, thereby mitigating environmental effects on the sensor cleaning system 202. In other examples, aspects of the sensor cleaning system 202 may include seals and/or other components that prevent moisture and/or other debris from entering the sensor window housing 302 and/or otherwise effecting components of the system 202.

FIG. 5 is a top view showing a sensor assembly 500 including the sensor cleaning assembly 202. Specifically, FIG. 5 shows a sensor 502 coupled to the sensor mount 308 of the sensor cleaning assembly 202. The sensor 502 may include one or more image capture devices, LIDAR sensors, and/or TOF sensors (e.g., such as one or more of the sensors 106, 108, 110, 112, 114, 116, described herein), though any other sensor is contemplated.

In the specific example of FIG. 5, the sensor 502 may be an imaging sensor generally including a sensor body 504 and a lens 506. As will be appreciated, light may be received at the sensor 502 through the lens, and the sensor body 504 retains one or more lens elements, imagers, electronics, and/or the like for generating image data based on light received through the lens 506. FIG. 5 also shows an optical axis 508 of the sensor 502.

In the illustrated example, a portion of the sensor body 504 is substantially cylindrical, and is disposed at least in part in a volume defined by the sensor window housing 304. The lens 506 also is disposed in the volume defined by the sensor window housing 304. Accordingly, when the sensor window housing 304 is opaque, the only light entering the sensor 502 at the lens 506 is via the sensor window 204. The volume defined by the sensor window housing 304 provides a clearance around the sensor body 504 and the lens 506, and the sensor 502 is fixed relative to the sensor mount 308. Accordingly, the sensor window housing 304 may rotate relative to (e.g., around) the sensor body 504 and the lens 506. The sensor window 204 thereby also rotates relative to the lens 506. Removing obstructions from the sensor window 204 by rotating the sensor window 204, as described herein, therefore results in removing obstructions to the sensor 502.

As illustrated in FIG. 5, the optical axis 508 of the sensor 502 is generally aligned (e.g., coaxial) with the rotational axis 302 of the sensor window 204. In examples, this may be advantageous for processing of the data generated by the sensor 502. For example, because the rotation of the sensor window 204 is symmetrical around the axis of rotation, artifacts created by the rotation may be reduced or eliminated. In other examples, computing systems receiving the data generated by the sensor 502 may process the data, e.g., using an algorithm, that accounts for artifacts due to spinning. In examples, a position of the sensor window 204 may be tracked during use, e.g., by a rotary encoder or the like, and the position of the sensor window 204 may be associated with the generated data. In still other examples, the position information may be used to ensure that the sensor window 204 is returned to a predetermined position, e.g., before driving the sensor window 204 to disperse obstructions.

Although the example of FIG. 5 shows the axis of rotation 302 of the sensor window 204 being substantially aligned with the optical axis 508 of the imaging sensor 502, other configurations also are contemplated. For example, FIGS. 10A and 10B, discussed below, show an implementation in which a sensor window is rotated about an axis that is offset relative to an optical axis of the sensor. Aspects of this disclosure also are not limited to instances in which the rotation of axis of the sensor window and the optical axis of the sensor are parallel. For example, axis of rotation may be tilted, e.g., to angle the sensor window 204 relative to a vertical direction. Angling the sensor window 204 may provide additional protection against precipitation, e.g., by allowing an upper portion of the sensor window housing 304 to protrude further forward than a lower portion of the sensor window housing 304. In this example, the sensor 502 will still sensor the environment through the sensor window 204. Accordingly, the axis of rotation 302 of the sensor window 204 will be angled relative to the optical axis 508, e.g., by an acute angle.

The sensor 502 may be an example of an optical sensor. Aspects of this disclosure may be used with other sensor modalities. Such modalities may or may not have an optical axis. In aspects of this disclosure, the axis of rotation 302 of the sensor window 204 may extend into a field of view of the sensor, regardless of the type of sensor. As used herein, for example, the axis of rotation 302 of the sensor window 302 may generally extend toward an object to be sensed by the sensor, e.g., generally in a sensing direction of the sensor. For example, a time-of-flight sensor may image a field of view corresponding to a two-dimensional array of pixels, but the time-of-flight sensor may not have an optical axis, per se. When used with a time-of-flight sensor, the sensor window 204 may be positioned such that an axis of rotation of the sensor window 204 extends toward or along a direction aligned with a portion of the environment that will be sensed by the time-of-flight sensor. In examples of this disclosure, the sensor window 204 may be distinct from a rotating sleeve, e.g., which may surround a sensor and rotate about an axis that is perpendicular to an optical axis or sensing direction of the sensor around which it is disposed.

Figure 6B:
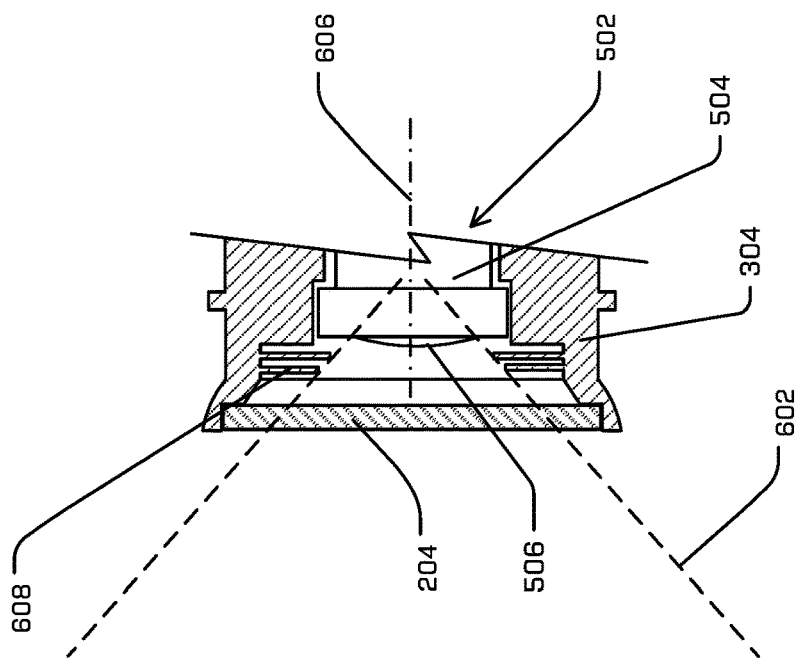
FIG. 6B is a cross-sectional view of the sensor system of FIG. 6A, taken along section line 6B-6B in FIG. 6A, in accordance with examples of this disclosure.
Figure 6A:
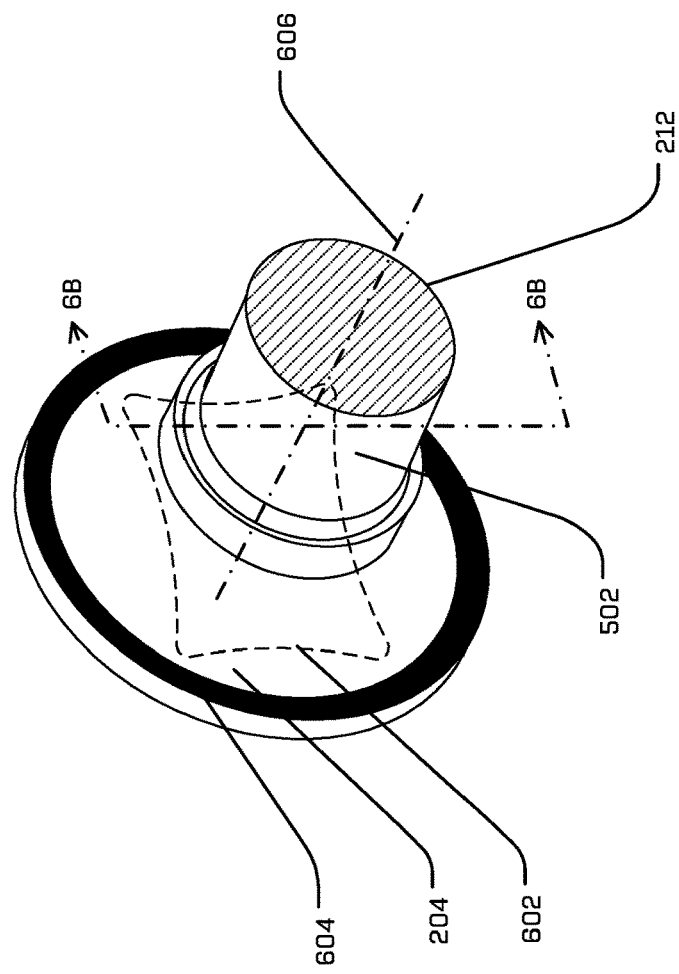
FIG. 6A is a rear perspective view of a portion of the sensor system of FIG. 5, in accordance with examples of the disclosure.
Figure 7:
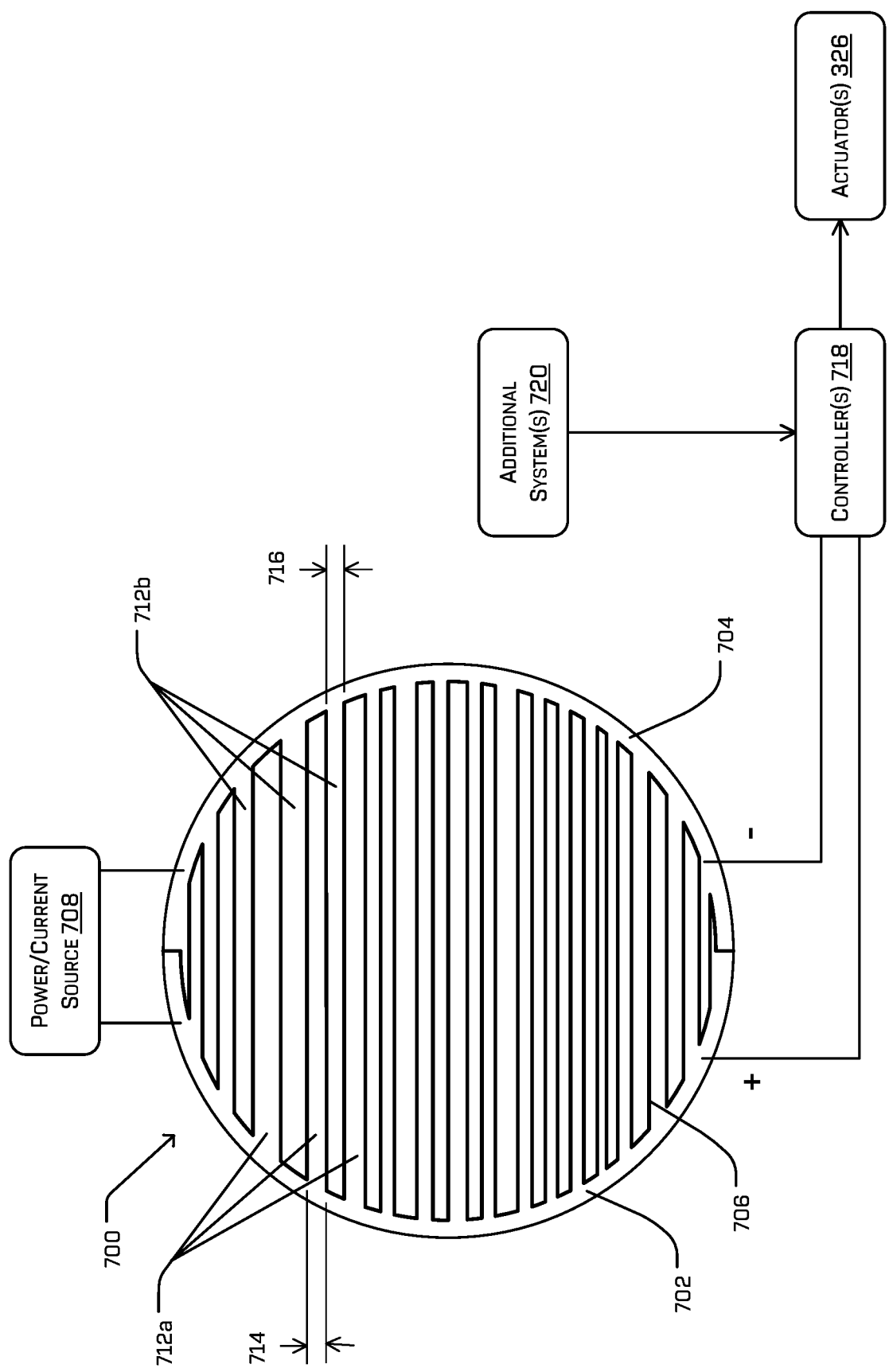
FIG. 7 is a plan view of a sensor window for use in a sensor cleaning assembly, in accordance with examples of this disclosure.

Additional details of the relationship of the sensor 502 to the sensor window 204 are illustrated in FIGS. 6A and 6B. Specifically, FIG. 6A is a partial perspective view showing a field of view 602 of the sensor 502 projected onto the sensor window 204. As shown, the field of view 602 is completely contained within the footprint of the sensor window 204, such that the sensor 502 senses the environment (entirely) through the sensor window 204. In the illustrated example, the extents of the sensor window 204 may be limited by an occlusion band 604. The occlusion band 604 may correspond to a portion of the sensor window 204 that abuts the sensor window housing 304 (e.g., at the ledge 316 discussed above), for example.

As illustrated, the extents of the sensor window 204 excluding the occlusion band 604 still extend beyond the bounds of the field of view 602. For example, the sensor window 204 is round, whereas the field of view 602 is substantially rectangular. As the sensor window 204 may be rotated relative to the sensor, the non-occluded region of the sensor window 204 will have a minimum diameter that is equal to or exceeds a maximum distance from the optical axis 508 of the sensor 502 to a farthest extent (e.g., one of the corners) of the field of view 602.

As noted above, when the sensor window housing 304 is opaque, only light that enters via the sensor window 204 may be received at the sensor 502. However, and as just discussed with reference to FIG. 6A, in some examples the sensor window 204 may be larger than the field of view 602 of the sensor 502. Accordingly, in some instances, light outside the field of view 602 of the sensor 502 may enter the sensor window housing. In these examples, the light outside the field of view 602 may reflect off one or more internal surfaces of the sensor window housing 304. After this reflection, this reflected light may enter the lens 506 and be imaged, e.g., as stray light.

FIG. 6B is a cross-sectional view taken along the section line 6B-6B in FIG. 6A. FIG. 6B shows additional details of the example field of view 602 associated with the sensor 502. In this example, an inner surface of the sensor window housing 304 further includes one or more protrusions 608. The protrusions 608 may mitigate some of the effects of stray light, just described. For example, the protrusions 608 may extend radially inwardly from the inner surface of the sensor window housing 304, toward the optical axis 508. As illustrated, the extent of the protrusions 608 may closely approximate a portion of the field of view 602. Accordingly, some light entering through the sensor window 204 (and outside the field of view 602) may impinge on the protrusion(s) 608. This impingement may prevent the internal reflection discussed above. For example, the protrusion(s) 608 may be configured to absorb light and/or to reflect light at an angle that causes the light to exit through the sensor window 204. As will be appreciated, because the protrusions 608 will rotate with the sensor window housing 304 and the sensor window 204, whereas the field of view 602 is fixed, the protrusions 608 may only act to effectively reduce a diameter through which light will be received at the lens.

FIG. 7 illustrates an example of a sensor window 700, which may be used as the sensor window 204 discussed above. The senor window 700 includes a first coated portion 702 and a second coated portion 704 separated by a non-conductive area 706. In some examples, the first coated portion 702 and the second coated portion 704 may be coated with indium tin oxide (ITO), and the non-conductive area 706 may correspond to a non-coated region or a region in which a coating has been removed, e.g., via etching or the like. ITO may be chosen as the coating because it is electrically conductive, as well as transparent in small thicknesses, however other materials may also or alternatively be used. Moreover, although this example describes the portions 702, 704 as coated portions, one or more of the portions 702, 704 may be a trace that is formed other than by a coating technique.

In the example of FIG. 7, the first coated portion 702 and the second coated portion 704 may form two electrical traces or terminals spaced from each other by the non-conductive region 706. As also illustrated in FIG. 7, a power source 708, e.g., a voltage source, a current source, or the like, may be connected to the first and second coated portions 702, 704 to apply current serially through those portions. As will be appreciated, because the window 700, like the window 202 discussed above, is configured to rotate, the power source 708 may be fixed to the window 700, e.g., to rotate with the window. In other examples, however, the power source 708 may be stationary, with power transferred to the rotating sensor window 700 via a slip ring commutator, or the like.

In some examples, the application of current through the first coated portion 702 and the second coated portion 704 may result in the generation of heat. This generated heat may be advantageously used to defrost the sensor window 700, for example.

In other examples, the first coated portion 702 and the second coated portion 704 may be used to identify or sense obstructions on the sensor window 700. As noted above, an electrical current may be passed through the circuit that includes the first coated portion 702 and the second coated portion 704. However, a conducive material that contacts both the first coated portion 702 and the second coated portion 704 may act to "short" the circuit, thereby changing an attribute or characteristic, e.g., a current, a voltage, a resistance, or the like, associated with the circuit. Thus, for instance, should a water droplet land on the sensor window 700 in such a manner that it contacts both the first coated portion 702 and the second coated portion 704, the circuit including the first coated portion 702 and the second coated portion 704 will "short" as current flows through the water droplet, resulting in a discernible difference in the circuit.

The first coated portion 702 and the second coated portion 704 may be designed to cooperate to identify obstructions using the techniques just described. In the example illustrated in FIG. 700, the first coated portion 702 includes a number of first elongated segments or fingers 712*a*, and the second coated portion 704 includes a number of second elongated segments or fingers 712*b*. As shown, the first and second fingers 712*a*, 712*b* are alternating or interleaved. As also illustrated, the first fingers 712*a* have a width 714, and the second fingers have a width 716. In examples, the widths 714, 716 may be the same or different and/or the widths 714, 716 may vary per finger 712. With the illustrated arrangement, the first fingers 712*a* are separated from the second fingers 712*b* by a width of the non-contact region 706. In examples, the width of the non-contact region 706 (and/or the widths 714, 716) may be selected to facilitate sensing of obstructions. For example, reducing a width of the non-contact region 706 (and thus a distance between adjacent fingers 712*a*, 712*b*) will allow a relatively smaller obstruction to create a short between adjacent fingers. Moreover, by reducing the widths 714, 716 of the fingers 712, a smaller droplet may contact more than one of the first fingers 712*a* and/or more than one of the second fingers 712*b*, which may result in a different impact on the current, the voltage, or other attribute of the circuit.

The arrangement of the first coated portion 702, the second coated portion 704, and the non-conductive portion 706 is intended to be an example only. Other arrangements also are contemplated and/or will be appreciated by those having ordinary skill in the art with the benefit of this disclosure. For example, the first coated portion 702 and the second coated portion can include concentric arcuate portions, circular elements, and/or other designs. In some examples, the relationship of the first coated portion 702 and the second coated portion 704 may be based at least in part on a characteristic of an obstruction to be identified.

The sensor window 700 may also be associated with the actuator 326. For example, the actuator 326 may driven based at least in part on a signal generated in response to a short or change in attribute of the circuit that includes the first coated portion 702 and the second coated portion 704, as just described. For example, the actuator(s) 326 can be driven upon sensing of an obstruction on the sensor window 700, e.g., to disperse the obstruction from the sensor window 700 as detailed herein.

FIG. 7 also shows one or more controllers 718. In examples, the controller(s) 718 can include functionality to monitor the circuit that includes the first coated portion 702 and the second coated portion 704, e.g., to identify changes to attributes of the circuit that indicate an obstruction on the surface of the sensor window 700. Upon identifying such changes, the controller(s) 718 may generate a signal to drive the actuator(s) 326. In some examples, the actuator(s) 326 may have a binary, e.g., on/off, control. In other examples, the controller(s) 718 may also include functionality to determine a velocity or torque at which to operate the actuator(s) 326. For example, based on a magnitude of a change in a characteristic of the circuit including the first and second coated portions 702, 704, the controller(s) 718 can generate different signals to drive the actuator(s) 326. For example, the controller(s) 718 may be configured to determine, based on monitoring the obstruction-detecting circuit described herein, a severity of an obstruction, e.g., a precipitation intensity, a size of the obstruction, or the like, and drive the actuator(s) 326 accordingly. For instance, in a heavier rainstorm, it may be desirable to rotate the sensor window 700 more quickly, whereas in a lighter rain or mist, a lower speed may be sufficient to dispel obstructions, while reducing power consumption and/or reducing heat generation at the actuator(s) 326. The controller(s) 718 may include and/or access look-up tables and/or the like to determine drive characteristics for the actuator(s) 326.

FIG. 7 also shows that the controller(s) 718 may be configured to optionally receive information from one or more additional system(s) 720. For example, the additional system(s) 720 can include vehicle systems that may identify obstructions or conditions likely to result in obstructions. For instance, the additional system(s) 720 can provide environmental information such as weather-related information. The additional system(s) 720 can also provide information about characteristics of the vehicle to which the sensor window 700 is mounted, e.g., the vehicle 100. For instance, the additional system(s) 720 can provide information about a speed of the vehicle, a yaw rate of the vehicle, a direction of travel of the vehicle, and/or any other characteristics of the vehicle. In examples, the controller(s) 718 may determine to increase a rotational velocity of the actuator(s) 326, and thus of the window 700, with increased velocity of the vehicle and/or when the direction of travel of the vehicle indicates that the sensor with which the window is associated is a front-facing sensor. The controller(s) 718 may control the actuators 326 at a lower velocity when the vehicle is stopped or moving below a threshold speed and/or when the sensor with which the window 700 is associated is a rear-facing sensor.

In still further examples, the controller(s) 718 may also be configured to receive information from the actuator(s) 326. For example, the controller(s) 718 may receive information about a speed of the actuator(s) 326. In examples, the controller(s) 718 can also include functionality to compare a measured or actual speed of the actuator to an expected or commanded speed. For instance, the controller(s) 718 can infer information about an obstruction based on a difference between the actual speed and the commanded speed. When an obstruction on the window has relatively more mass, the actuator(s) 326 may encounter more resistance, which may be measured as a difference in expected and actual velocities of the actuator(s) 326. Without limitation, the actuator(s) 326 may include or have associated therewith a rotary encoder or other sensor.

In still further examples, the controller(s) 718 may be configured to share information with one or more other controller(s) associated with other sensor systems. As discussed above in connection with FIGS. 1 and 2, the vehicle 100 can include a number of sensor pods 102, and each of the sensor pods 102 can include a number of sensors. Other sensors can also be disposed on the vehicle 100. Aspects of this disclosure can include communicating information about obstructions, e.g., detected using the techniques discussed herein, to other sensor pods/sensors to implement sensor cleaning at those other sensors. In one example, an obstruction may be detected at a sensor window associated with one sensor, and all sensor windows may be caused to rotate, e.g., as the single obstruction may be indicative of precipitation or some other event that could impact all sensors. However, an obstruction may effect only a single sensor, e.g., when the obstruction is a piece of debris or organic matter that has impacted the sensor window, or some subset of the sensors, e.g., when the obstruction is road spray caused by a neighboring vehicle passing through a puddle or the like. In these examples, the controller(s) 718 may be configured to advantageously actuate some subset of the spinning sensor windows.

Modifications to the foregoing also are contemplated. For example, although the first coated portion 702 and the second coated portion 704 are illustrated as covering substantially all of the sensor window 700, in other examples, the coated portions 702, 704 may be smaller or otherwise positioned. For example, when the coated portions 702, 704 are used only as heating elements, as discussed above, it may be desirable to place the traces outside a field of view of the sensor. In one example, the traces may be placed in an obstructed area of the window, e.g., like the obstructed area 604 of the window 204, discussed above. In some examples, the sensor window 700 (or the sensor window 202 discussed herein) may also or alternatively be heated from a separate heat source. The heat source may be an already-present component that generates heat, such as the actuator(s) 326, the sensor 502, or the like. An extra heating component (now shown) may also be present.

Figures 8, 9:
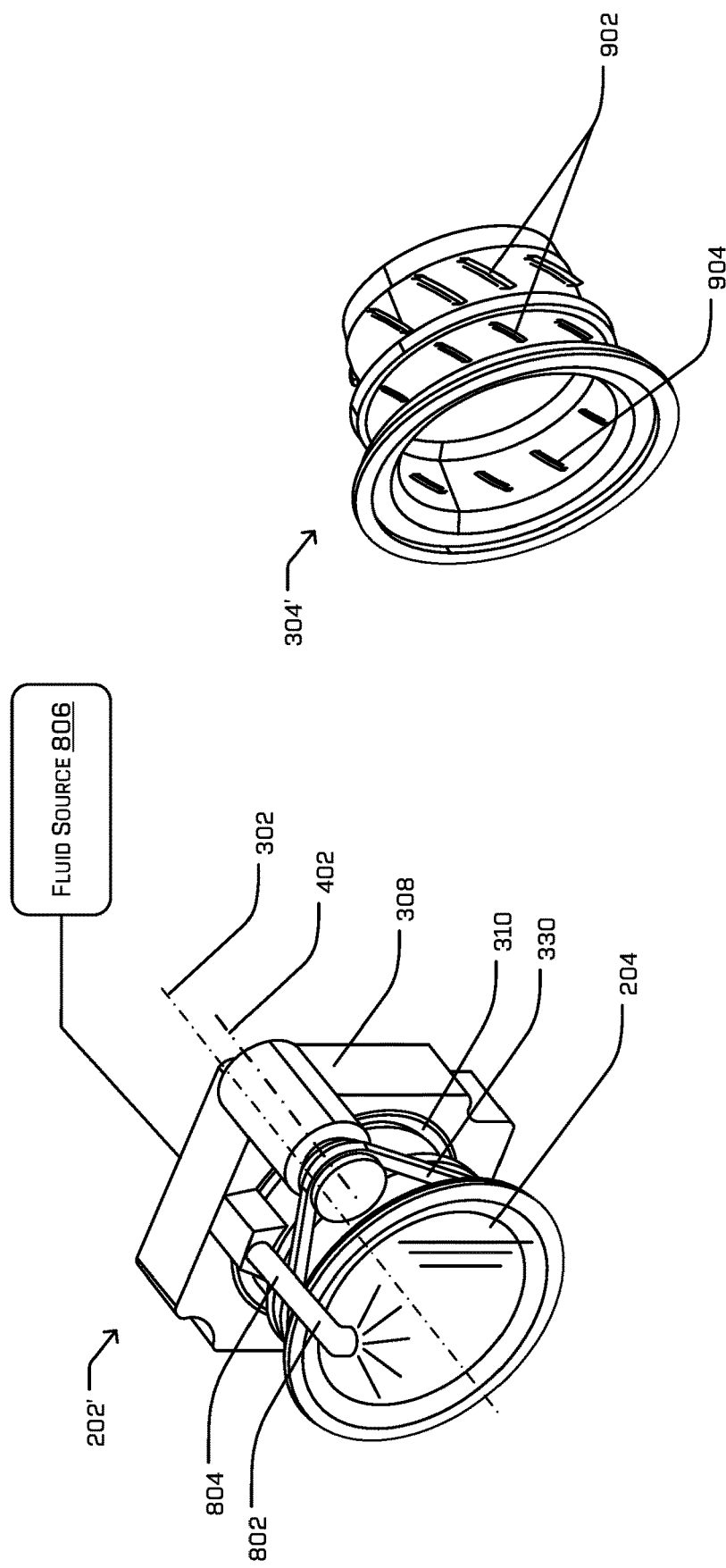
FIG. 8 is a perspective view of another example of a sensor cleaning assembly, in accordance with examples of this disclosure.
FIG. 9 is a perspective view of an alternative example sensor window housing, in accordance with examples of this disclosure.

Modifications to the sensor cleaning assembly 232 also are contemplated. For example, FIG. 8 shows a modified sensor cleaning assembly 202', corresponding generally to the sensor cleaning assembly 202 of FIG. 4, but modified to include a fluid nozzle 802. In the example, the fluid nozzle 802 comprises a conduit 804 in fluid communication with a fluid source 806. In examples, the fluid nozzle 802 may be controllable to selectively emit (e.g., spray) a fluid from the fluid source 806 onto the sensor window 204. After spraying the sensor window 204, the sensor window 204 may be rotated, as described herein, to dispel the fluid from the surface of the sensor window 204. In some examples, the fluid nozzle 802 may be controlled to emit the fluid upon startup of a vehicle, e.g., to ensure that the sensor window 204 is clean at dispatch. The fluid nozzle 802 may also be controlled to perform on-demand cleaning of the sensor window 202. For instance, when only one sensor is experiencing an obstruction, e.g., as determined by the techniques described herein or otherwise, the fluid nozzle 802 associated with that sensor may be controlled to clean the associated sensor window 204. The fluid may be water, a solution including a cleaning agent, a solution including a defrosting agent, and/or any other fluid.

Although the fluid nozzle 802 is illustrated as being integrated into the sensor mount 308, this arrangement is not required. In some examples, the fluid nozzle 802 may be completely separate from the sensor cleaning assembly 202, 202'. For example, the fluid nozzle 802 may be positioned anywhere that allows for dispensing of the fluid from the fluid source 806 on to the sensor window 204.

FIG. 9 shows another example modification to components described herein. Specifically, FIG. 9 is a perspective view of a sensor window housing 304', generally corresponding to the sensor window housing 304 discussed herein. In this example, the sensor window housing 304' includes a number of external fins 902 and a number of internal fins 904. In examples, the external fins 902 and/or the internal fins 904 may facilitate heat transfer in a system including the sensor window housing 304'. Specifically, as the sensor window housing 304' rotates to rotate an associated sensor window, the fins 902, 904 may direct ambient air, e.g., in a generally axial direction. In some examples, the generated air flow may be used to cool components of a sensor assembly, including a sensor, an actuator driving the sensor window housing 304', or the like. The airflow generated by the fins 902, 904 may also, or alternatively, be used to heat a sensor window. For example, the fins 902, 904 may direct heat generated by the sensor, generated by the actuator, and/or otherwise present in the environment onto the sensor window, e.g., to defrost the sensor window. Although FIG. 9 shows both the internal fins 902 and the external fins 904, in other examples, the sensor window housing may include only the internal fins 902 or the external fins 904. Moreover, the fins are shown for example only. Other features, such as grooves, ridges, openings, and/or the like may also be used to create a desired airflow from the rotation of the sensor window housing 304'.

FIGS. 10A and 10B are front and side views of a sensor assembly 1000 according to additional aspects of this disclosure. Specifically, the sensor assembly 1000 includes a sensor 1002 and a sensor cleaning system 1004. The sensor 1002 can be any type or modality of sensor, including those sensors described herein. In the illustrated example, the sensor 1002 may be an imaging sensor having an optical axis 1006, as illustrated in FIG. 10B.

The senor cleaning system 1004 may an alternative to and/or may incorporate any features and/or functions of the sensor cleaning system 202, discussed herein. In more detail, the sensor cleaning system 1004 includes a sensor cleaning window 1008, which may be similar to or the same in composition as the sensor windows 202, 700 discussed herein. In this example, the sensor window 1008 is driven to rotate by an actuator 1010. More specifically, a shaft 1012 of the actuator 1010 is coupled to the sensor window 1008 by a hub 1014. In the example, the sensor window 1008 is coupled directly to the actuator 1010, such that an axis of rotation of the shaft 1012 of the actuator 1010 is an axis of rotation 1016 of the sensor window 1008. In this example, unlike the example of FIGS. 3-5 discussed above, the axis of rotation 1016 of the sensor window 1008 is offset relative to the optical axis 1006 of the sensor 1002. However, like the example of FIGS. 3-5, the axis of rotation 1016 of the sensor window 1008 generally extends in a sensing direction or into a field of view 1020 of the sensor 1002. FIGS. 10A and 10B also show a housing 1018, which includes features to house the sensor 1002 and/or to position the actuator 1010 relative to the sensor 1002. The housing 1018 is also illustrated as including or having associated therewith a pair of guides 1022 that are disposed at positions proximate the periphery of the sensor window 1008. For example, the guides 1002 may be positioned to contact the sensor window 1008 to reduce wobble or other unwanted movement of the sensor window 1008, e.g., during rotation.

Because the axis of rotation 1016 of the sensor window 1008 is offset relative to the optical axis 1006 of the sensor 1002, a portion of the sensor window 1008 is outside the field of view 1020 of the sensor. In the illustrated example, a relatively large portion of the sensor window 1008 is outside the field of view 1020. In examples, the sensor cleaning system 1004 can also include a physical cleaning member 1024 disposed proximate the sensor window 1008, but outside the field of view 1020 of the sensor 1002. In the illustrated example, the cleaning member 1024 may be a wiper blade, an absorbent material, and/or any other member that aids in removal of obstructions from the sensor window 1008. The cleaning member 1024 may be fixed relative to the senor 1002 and/or the housing 1018, such that rotation of the sensor window 1008 causes relative movement of the sensor window and the cleaning member 1024, allowing for the cleaning member to remove obstructions, debris, or the like. Although only a single instance of the cleaning member 1024 is shown, it may be desirable to include more than one instance. For example, different instances of the cleaning member 1024 can provide for different surfaces or cleaning media. Moreover, the use of multiple instances of the cleaning member 1024 may be useful to facilitate optimal cleaning regardless of the direction of travel of the sensor window 1008. For instance, the illustrated instance of the cleaning member may advantageously remove obstructions from the sensor window 1008 at a portion of the sensor window that is about to pass through the field of view 1020 when the sensor window 1008 is rotated clockwise (in the orientation of FIG. 10A). A second instance of the cleaning member 1024 may be positioned proximate an opposite side of the housing 1018, e.g., to remove obstructions from a portion of the sensor window that is about to pass through the field of view 1020 when the sensor window is rotated counterclockwise (in the orientation of FIG. 10B).

The sensor cleaning system 1004 may also be useful to remove obstructions from the fields of view of multiple sensors. For example, although only a single instance of the sensor 1002 is shown in FIGS. 10A and 10B, a footprint of the sensor window 1004 is sufficiently large that multiple sensors may be configured to sense an environment through the sensor window 1004. For example, an array of sensors can be provided in a single housing (as with a sensor pod) or multiple, separate housings, and the sensor window 1008 may be positioned to block (and remove) obstructions that may otherwise affect those sensors.

Figure 11:
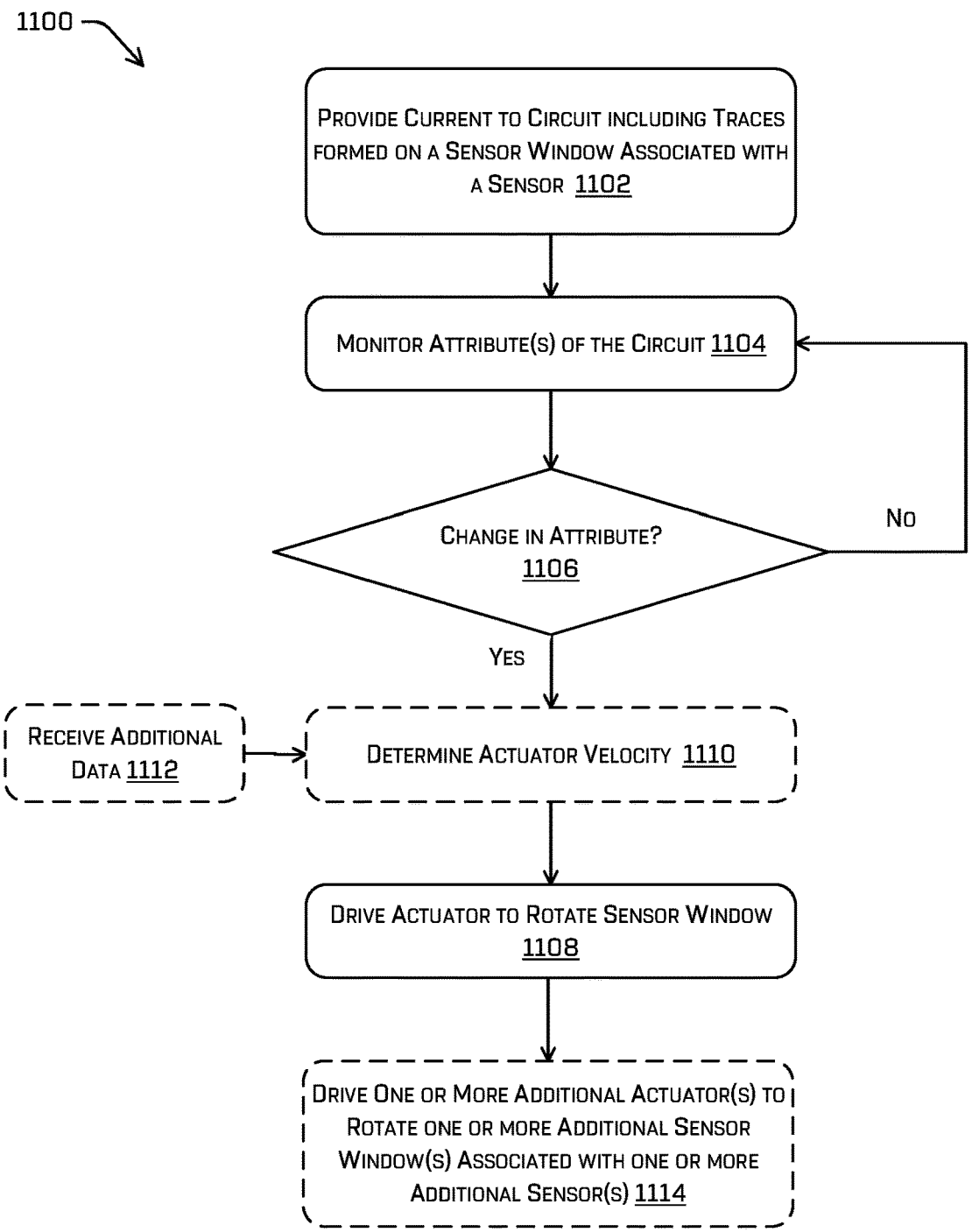
FIG. 11 is a flowchart illustrating an example process of controlling cleaning of one or more sensors, in accordance with examples of this disclosure.

FIG. 11 is an example process 1100 of controlling cleaning one or more sensors. For example, some or all of the process 1100 can be performed by one or more components in FIGS. 1-10, as described herein. For example, some or all of the process 1100 can be performed by the controller(s) 128, 718, as detailed herein.

At an operation 1102, the process can include providing current to a circuit including traces formed on a sensor window associated with a sensor. For example, the traces may correspond to the first and second coated portions 702, 704 formed on the sensor window 700, described above. The power source 710 may provide a current, voltage, or the like, through a circuit that includes the portions 702, 704 arranged in series.

At an operation 1104, the process 1100 monitoring one or more attributes of the circuit 1104. For example, and without limitation, the controller(s) 718 can be configured to measure a voltage, a current, a continuity, a resistance, and/or other characteristics of the circuit.

At an operation 1106, the process 1100 can include determining whether there is a change in the attribute. If, at the operation 1106 it is determined that there is no change in the attribute, the process 1100 can continue to monitor the attributes at the operation 1104.

However, if at the operation 1106 it is determined that there is a change in the attribute, at an operation 1108 the process 1100 can include driving an actuator to rotate the sensor window. As described herein, aspects of this disclosure relate to providing a sensor window through which a sensor senses an environment, and rotating the sensor window to dispel obstructions on the sensor window. In the example process 1100, the change in the attribute of the circuit determined at the operation 1106 may indicate a presence of an obstruction on the sensor window. The rotation of the sensor window dispels the obstruction.

The process 1100 may also optionally include an operation 1110. The operation 1110 can include determining an actuator velocity. Specifically, the actuator velocity may be a velocity for spinning the sensor window during implementation of the operation 1108. Without limitation, the operation 1110 can include determining the actuator velocity based at least in part on the change in attribute determined at the operation 1106. For example, a relatively large voltage change in the circuit May signify a denser or more persistent obstruction, which may require a higher angular velocity to remove.

In some examples, the process 1100 may also optionally include, at an operation 1112, receiving additional data. For example, the velocity determined at the operation 1110 may be based at least in part on the additional data received at the operation 1112. Without limitation, the additional data may be data associated with a current condition of the vehicle to which the sensor is attached, e.g., a velocity, yaw rate, or the like, of the vehicle. The additional data may also or alternatively include data associated with an environment or atmosphere of the vehicle, e.g., an outside temperature, information about precipitation, or the like. Without limitation, the additional data received at the operation 1112 may be received from the additional system(s) 720, the actuator (s) 326, and/or any other data sources.

At an operation 1114, the process 1100 can optionally include driving one or more additional actuator to rotate one or more additional sensor windows associated with one or more additional sensors. Without limitation, aspects of this disclosure may provide a modular solution in which a subset of sensors, e.g., one sensor, has an associated sensor window to remove obstructions that would impede sensing of an environment. Operation of the windows may be coordinated at the operation 1114, e.g., such that if one sensor is obstructed, all sensors or some subset of sensors including the sensor that detected the obstruction (like all sensors in a sensor pod) may be cleaned. Aspects of the process 1100 contemplate the use of a sensor window with a pair of traces to identify an obstruction on the sensor window. When an obstruction is detected, the sensor window may be rotated to dispel the obstruction. However, the sensor cleaning assemblies of this disclosure are not limited to being used with traces that identify obstructions. For example, obstructions may be identified any of a number of conventional methods, including but not limited to imaging techniques, machine-learned techniques, direct observation (e.g., in data generated by the sensor), and/or other techniques. Some techniques for detecting obstructions are discussed in U.S. patent application Ser. No. 17/540,051, entitled "Cleaning Vehicle Sensors," and filed on Dec. 1, 2021, the entire contents of which is hereby incorporated by reference.

Example Clauses

Any of the example clauses in this section may be used with any other of the example clauses and/or any of the other examples or embodiments described herein.

A: An example sensor system for a vehicle, the sensor system including: a camera coupled to the vehicle and configured to generate image data indicative of an environment of the vehicle; a sensor window proximate the camera and disposed such that the camera images the environment through the sensor window to generate the image data; a sensor window housing coupled to the sensor window; and an actuator coupled to the sensor window housing and configured to cause the sensor window housing and the sensor window to rotate relative to the camera, about an axis of rotation that is substantially coaxial with an optical axis of the camera, the rotation of the sensor window causing obstructions on the sensor window to disperse from the sensor window.

B: The sensor system according to example A, wherein the sensor window housing comprises a cylindrical outer surface and a groove formed in the cylindrical outer surface, the sensor system further comprising: a belt driven by the actuator and at least partially disposed in the groove to transmit rotation of the actuator to rotate the sensor window housing.

C: The sensor system according to example A or example B, wherein the sensor window further comprises a first electrical trace and a second electrical trace formed on a surface thereof, the sensor system further comprising: a power source electrically connected to and passing current through a circuit including the first electrical trace and the second electrical trace.

D: The sensor system according to any one of example A through example C, further comprising a controller configured to perform actions comprising: monitoring an attribute of the circuit; and detecting an obstruction on the sensor window based at least in part a change in the attribute of the circuit.

E: The sensor system according to any one of example A through example D, wherein the controller is further configured to perform actions comprising: generating, based at least in part on the detecting the obstruction, a signal that causes the actuator to commence rotation of the sensor window housing and the sensor window.

F: The sensor system according to any one of example A through example E, wherein the sensor window comprises a lens element associated with the camera.

G: An example sensor system includes: a sensor configured to generate sensor data corresponding to a field of view of the sensor; a sensor window disposed proximate the sensor such that the sensor senses an environment through the sensor window to generate the sensor data; and an actuator configured to rotate the sensor window relative to the sensor about a rotational axis that extends into the field of view of the sensor.

H: The sensor system according to example G, further comprising a sensor window housing, wherein the sensor window is fixed in the sensor window housing, and the actuator is configured to rotate the sensor window housing.

I: The sensor system according to example G or example H, wherein the sensor window housing comprises a groove in an outer surface, the sensor system further comprising: a belt driven by the actuator and disposed at least partially in the groove to transfer motion from the actuator to the sensor window housing.

J: The sensor system according to any one of example G through example I, wherein the sensor window housing includes a sidewall defining an interior surface and one or more fins protrude from the interior surface to block light rays entering the sensor window housing via the sensor window.

K: The sensor system according to any one of example G through example J, wherein: at least a portion of the sensor window is outside a field of view of the sensor.

L: The sensor system according to any one of example G through example K, further comprising a cleaning member fixed relative to the sensor and configured to contact an outer surface of the portion of the sensor window outside the field of view of the sensor.

M: The sensor system according to any one of example G through example L, further comprising: the sensor; and a second sensor proximate the sensor, wherein the sensor and the second sensor are position to sense the environment through the sensor window.

N: The sensor system according to any one of example G through example M, wherein the sensor window comprises a first electrical trace and a second electrical trace formed on a surface thereof, the sensor system further comprising: a current source electrically connected to and passing current through a circuit including the first electrical trace and the second electrical trace.

O: The sensor system according to any one of example G through example N, further comprising a controller configured to perform actions comprising: monitoring an attribute of the circuit; and detecting an obstruction on the sensor window based at least in part a change in the attribute of the circuit.

P: The sensor system according to any one of example G through example O, wherein the controller is further configured to perform actions comprising: generating, based at least in part on the detecting the obstruction, a signal that causes the actuator to commence rotation of the sensor window.

Q: The sensor system according to any one of example G through example P, further comprising a controller configured to perform actions comprising: receiving information about one or more of a speed of a vehicle on which the sensor system is mounted; and controlling the actuator based at least in part on the speed of the vehicle.

R: An example sensor cleaning system for mitigating obstructions to generating sensor data, the sensor cleaning system including: a sensor window housing configured to be mounted relative to a sensor; a sensor window coupled to the sensor window housing, the sensor window being disposed proximate the sensor such that the sensor senses an environment through the sensor window to generate the sensor data; and an actuator configured to rotate the sensor window relative to the sensor about a rotational axis that extends into a field of view of the sensor.

S: The sensor cleaning system according to example R, wherein the sensor window further comprises an electrical trace formed on a surface thereof, the sensor cleaning system further comprising: a current source electrically connected to and passing current through the electrical trace.

T: The sensor cleaning system according to example R or example S, wherein the sensor window housing is mounted to cause the sensor window to rotate about an optical axis of the sensor.

While the example clauses described above are described with respect to one particular implementation, it should be understood that, in the context of this document, the content of the example clauses may also be implemented via a method, device, system, a computer-readable medium, and/or another implementation.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A sensor system for a vehicle, the sensor system comprising:
   a camera coupled to the vehicle and configured to generate image data indicative of an environment of the vehicle;
   a sensor window disposed such that the camera images the environment through the sensor window to generate the image data;
   a sensor window housing coupled to the sensor window, the sensor window housing comprising a cylindrical body extending axially from the sensor window;
   a bearing comprising an outer ring and an inner annular ring that rotates relative to the outer ring, wherein the cylindrical body of the sensor window housing extends through the inner annular ring and an outer surface of the cylindrical body is coupled to a surface of the inner annular ring such that the cylindrical body rotates with the inner annular ring, and
   an actuator coupled to the sensor window housing and configured to cause the sensor window housing and the sensor window to rotate relative to the camera, about an axis of rotation that is substantially coaxial with an optical axis of the camera, the rotation of the sensor window causing obstructions on the sensor window to disperse from the sensor window.

2. The sensor system of claim 1, wherein the sensor window housing further comprises a groove formed in the outer surface of the cylindrical body, the sensor system further comprising:
   a belt driven by the actuator and at least partially disposed in the groove to transmit rotation of the actuator to rotate the sensor window housing.

3. The sensor system of claim 1, wherein the sensor window further comprises a first electrical trace and a second electrical trace formed on a surface thereof, the sensor system further comprising:
   a power source electrically connected to and passing current through a circuit including the first electrical trace and the second electrical trace.

4. The sensor system of claim 3, further comprising a controller configured to perform actions comprising:
   monitoring an attribute of the circuit; and
   detecting an obstruction on the sensor window based at least in part a change in the attribute of the circuit.

5. The sensor system of claim 4, wherein the controller is further configured to perform actions comprising:

generating, based at least in part on the detecting the obstruction, a signal that causes the actuator to commence rotation of the sensor window housing and the sensor window.

6. The sensor system of claim 1, wherein the sensor window comprises a lens element associated with the camera.

7. A sensor system comprising:
   a sensor configured to generate sensor data corresponding to a field of view of the sensor;
   a sensor window disposed such that the sensor senses an environment through the sensor window to generate the sensor data
   a sensor window housing comprising a cylindrical body extending axially from the sensor window;
   a bearing comprising an outer ring and an inner annular ring that rotates relative to the outer ring, wherein the cylindrical body of the sensor window housing extends through the inner annular ring and an outer surface of the cylindrical body is coupled to a surface of the inner annular ring such that the cylindrical body rotates with the inner annular ring; and
   an actuator configured to rotate the sensor window relative to the sensor about a rotational axis that extends into the field of view of the sensor.

8. The sensor system of claim 7, wherein the sensor window is fixed in the sensor window housing, and the actuator is configured to rotate the sensor window housing.

9. The sensor system of claim 8, wherein the sensor window housing comprises a groove in the outer surface of the cylindrical body, the sensor system further comprising:
   a belt driven by the actuator and disposed at least partially in the groove to transfer motion from the actuator to the sensor window housing.

10. The sensor system of claim 8, wherein the sidewall of the sensor window defines an interior surface and one or more fins protrude from the interior surface to block light rays entering the sensor window housing via the sensor window.

11. The sensor system of claim 7, wherein:
    at least a portion of the sensor window is outside a field of view of the sensor.

12. The sensor system of claim 11, further comprising a cleaning member fixed relative to the sensor and configured to contact an outer surface of the portion of the sensor window outside the field of view of the sensor.

13. The sensor system of claim 12, further comprising:
    the sensor; and
    a second sensor proximate the sensor,
    wherein the sensor and the second sensor are positioned to sense the environment through the sensor window.

14. The sensor system of claim 7, wherein the sensor window comprises a first electrical trace and a second electrical trace formed on a surface thereof, the sensor system further comprising:
    a current source electrically connected to and passing current through a circuit including the first electrical trace and the second electrical trace.

15. The sensor system of claim 14, further comprising a controller configured to perform actions comprising:
    monitoring an attribute of the circuit; and
    detecting an obstruction on the sensor window based at least in part a change in the attribute of the circuit.

16. The sensor system of claim 15, wherein the controller is further configured to perform actions comprising:

generating, based at least in part on the detecting the obstruction, a signal that causes the actuator to commence rotation of the sensor window.

17. The sensor system of claim 7, further comprising a controller configured to perform actions comprising:
receiving information about one or more of a speed of a vehicle on which the sensor system is mounted; and
controlling the actuator based at least in part on the speed of the vehicle.

18. A sensor cleaning system for mitigating obstructions to generating sensor data, the sensor cleaning system comprising:
a sensor window housing configured to be mounted relative to a sensor, the sensor window housing comprising a cylindrical body;
a sensor window coupled to the sensor window housing, the sensor window being disposed such that the sensor senses an environment through the sensor window to generate the sensor data;
a bearing comprising an outer ring and an inner annular ring that rotates relative to the outer ring, wherein the cylindrical body of the sensor window housing extends through the inner annular ring and an outer surface of the cylindrical body is coupled to a surface of the inner annular ring such that the cylindrical body rotates with the inner annular ring; and
an actuator configured to rotate the sensor window relative to the sensor about a rotational axis that extends into a field of view of the sensor.

19. The sensor cleaning system of claim 18, wherein the sensor window further comprises an electrical trace formed on a surface thereof, the sensor cleaning system further comprising:
a current source electrically connected to and passing current through the electrical trace.

20. The sensor cleaning system of claim 19, wherein the sensor window housing is mounted to cause the sensor window to rotate about an optical axis of the sensor.

* * * * *